US009266618B2

(12) United States Patent
Tillman et al.

(10) Patent No.: US 9,266,618 B2
(45) Date of Patent: Feb. 23, 2016

(54) GAS TURBINE ENGINE TURBINE BLADE TIP ACTIVE CLEARANCE CONTROL SYSTEM AND METHOD

(71) Applicant: HONEYWELL INTERNATIONAL INC., Morristown, NJ (US)

(72) Inventors: Don Tillman, Fountain Hills, AZ (US); Raymond Gage, Phoenix, AZ (US); Rich Barrett, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 121 days.

(21) Appl. No.: 14/082,755

(22) Filed: Nov. 18, 2013

(65) Prior Publication Data

US 2015/0142216 A1    May 21, 2015

(51) Int. Cl.
*B64D 31/06* (2006.01)
*F02C 9/16* (2006.01)
*F01D 11/20* (2006.01)
*F01D 11/24* (2006.01)
*F02C 7/18* (2006.01)

(52) U.S. Cl.
CPC ............... *B64D 31/06* (2013.01); *F01D 11/20* (2013.01); *F01D 11/24* (2013.01); *F02C 7/18* (2013.01); *F02C 9/16* (2013.01); *F05D 2260/20* (2013.01); *F05D 2260/201* (2013.01); *F05D 2260/57* (2013.01); *F05D 2270/07* (2013.01); *F05D 2270/44* (2013.01)

(58) Field of Classification Search
CPC ......... F01D 11/14; F01D 11/16; F01D 11/20; F01D 11/24; F02C 9/16; F02C 7/18; B64D 31/06; F05D 2260/20; F05D 2260/201; F05D 2260/57; F05D 2270/07; F05D 2270/44; G01D 11/20; G01D 11/24
See application file for complete search history.

(56) References Cited

U.S. PATENT DOCUMENTS

| 4,023,731 | A | 5/1977 | Patterson |
| 4,363,599 | A | 12/1982 | Cline et al. |
| 4,893,984 | A | 1/1990 | Davison et al. |
| 5,181,826 | A | 1/1993 | Rock |
| 5,281,085 | A | 1/1994 | Lenahan et al. |
| 5,351,732 | A | 10/1994 | Mills et al. |

(Continued)

FOREIGN PATENT DOCUMENTS

| WO | 2004/097181 A1 | 11/2004 |
| WO | 2005/049971 A1 | 6/2005 |
| WO | 2005049971 A1 | 6/2005 |

OTHER PUBLICATIONS

EP Search Report for Application No. EP 14189292.7 dated Mar. 9, 2015.

*Primary Examiner* — Khoi Tran
*Assistant Examiner* — Robert Nguyen
(74) *Attorney, Agent, or Firm* — Ingrassia Fisher & Lorenz, P.C.

(57) ABSTRACT

A system and method of controlling turbine blade tip-to-static structure clearance in a gas turbine engine includes processing aircraft data to determine when the aircraft is flying at altitude cruise conditions. When the aircraft is not flying at altitude cruise conditions, then compressor discharge air is directed to impinge upon at least a portion of the turbine shroud. Upon determining that the aircraft is flying at altitude cruise conditions, the compressor discharge air is directed to flow across at least a portion of the turbine case and to impinge upon at least a portion of the turbine shroud.

13 Claims, 5 Drawing Sheets

(56) References Cited

U.S. PATENT DOCUMENTS

| | | |
|---|---|---|
| 5,639,210 A | 6/1997 | Carpenter et al. |
| 6,116,852 A | 9/2000 | Pierre et al. |
| 6,126,390 A | 10/2000 | Bock |
| 6,129,513 A | 10/2000 | Halliwell et al. |
| 6,254,345 B1 | 7/2001 | Harris et al. |
| 6,435,823 B1 | 8/2002 | Schroder |
| 6,487,491 B1 | 11/2002 | Karpman et al. |
| 6,863,495 B2* | 3/2005 | Halliwell et al. .......... 415/173.1 |
| 6,925,814 B2 | 8/2005 | Wilson et al. |
| 7,086,233 B2 | 8/2006 | Chehab et al. |
| 7,524,164 B2 | 4/2009 | Wunderlich et al. |
| 7,597,537 B2 | 10/2009 | Bucaro et al. |
| 7,824,151 B2 | 11/2010 | Schwarz et al. |
| 8,092,146 B2 | 1/2012 | Legare et al. |
| 8,126,628 B2 | 2/2012 | Hershey et al. |
| 2004/0219011 A1 | 11/2004 | Albers et al. |
| 2005/0126181 A1* | 6/2005 | Wilson .................. F01D 11/24 60/785 |
| 2009/0037035 A1* | 2/2009 | Hershey ................ F01D 11/24 701/3 |
| 2010/0247297 A1 | 9/2010 | Legare |
| 2011/0002774 A1 | 1/2011 | Karafillis et al. |
| 2011/0229306 A1* | 9/2011 | Lewis .................... F01D 11/24 415/115 |
| 2011/0236179 A1* | 9/2011 | Rog et al. ............... F01D 11/24 415/1 |
| 2013/0149123 A1 | 6/2013 | Laurello |
| 2013/0177414 A1* | 7/2013 | Bonneau et al. ................ 416/1 |

* cited by examiner

GAS TURBINE ENGINE TURBINE BLADE TIP ACTIVE CLEARANCE CONTROL SYSTEM AND METHOD

TECHNICAL FIELD

The present invention generally relates to gas turbine engines, and more particularly relates to turbine blade clearance control.

BACKGROUND

For gas turbine engines, it is generally known that the operational clearances between static engine structures and the tips of rotating blades impact the thermodynamic efficiency and fuel burn (e.g., specific fuel consumption or SFC) of the engine. Hence, gas turbine engine manufacturers continually seek ways to reduce these operational clearances, while at the same time avoiding rubs between the rotating blade tips and the static structure. The value of even several thousandths of an inch improvement can be quite significant.

Unfortunately, the lengths of the blade tips typically vary at a different rate than the static structures can expand or contract to accommodate the change in blade tip length, especially during transient operations. This can result in the blade tips contacting the static structure or cause excess clearance between the blade tips and static structure, both of which can reduce engine performance. One method that has been implemented to match the different growth rates is to supply a flow of air from the engine onto various rotor and/or static structures to reduce the operational clearances during steady state, high altitude cruise conditions.

Many gas turbine engines use either a static tip clearance control system or an active tip clearance control system. With typical static systems, cooling air is supplied through metered passages at a constant percentage of core flow rate. With typical active systems, complex tubes, manifolds and/or extra layers of turbine cases are used, which can significantly increase weight and cost, and often use air from different engine stations, which can significantly increase complexity and potential failure modes.

Hence, there is a need for a relatively simple tip clearance control system that fits within a current gas turbine engine envelope and that uses local compressor discharge air to feed directly into the turbine case system. The present invention addresses at least this need.

BRIEF SUMMARY

In one embodiment, a method of controlling turbine blade tip-to-static structure clearance in a gas turbine engine that is installed on an aircraft and that includes a turbine shroud and a turbine case includes processing aircraft data to determine when the aircraft is flying at altitude cruise conditions. When the aircraft is not flying at altitude cruise conditions, then compressor discharge air is directed to impinge upon at least a portion of the turbine shroud. Upon determining that the aircraft is flying at altitude cruise conditions, the compressor discharge air is directed to flow across at least a portion of the turbine case and to impinge upon at least a portion of the turbine shroud.

In another embodiment, a turbine blade tip-to-static structure clearance control system includes an aircraft gas turbine engine, and a control system. The aircraft gas turbine engine includes a compressor section and a turbine section. The turbine section is mounted in an engine case and includes a plurality of turbine blades surrounded by a shroud. Each turbine blade has a turbine blade tip that is spaced apart from the shroud by a clearance. The control system is in operable communication with the aircraft gas turbine engine and is configured to determine when the aircraft is flying at altitude cruise conditions, direct air discharged from the compressor section to impinge upon at least a portion of the turbine shroud when the aircraft is not flying at altitude cruise conditions, and upon determining that the aircraft is flying at altitude cruise conditions, direct the air discharged from the compressor section to flow across at least a portion of the turbine case and to impinge upon at least a portion of the turbine shroud.

In yet another embodiment, a turbine blade tip-to-static structure clearance control system includes an aircraft gas turbine engine, a control system, and a control mechanism. The aircraft gas turbine engine includes a compressor section and a turbine section. The turbine section is mounted in an engine case and includes a plurality of turbine blades surrounded by a shroud. Each turbine blade has a turbine blade tip that is spaced apart from the shroud by a clearance. The control system is in operable communication with the aircraft gas turbine engine. The control system is configured to determine when the aircraft is flying at altitude cruise conditions and, based on this determination, to supply actuation commands. The control mechanism is mounted in the aircraft gas turbine engine and is coupled to receive the actuation commands and is configured, in response to the actuation commands, to move between a first position and a second position. In the first position, the air discharged from the compressor section is directed from the compressor section to only impinge upon at least a portion of the turbine shroud when the aircraft is not flying at altitude cruise conditions. In the second position, the air discharged from the compressor section is directed to flow across at least a portion of the turbine case and to impinge upon at least a portion of the turbine shroud.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
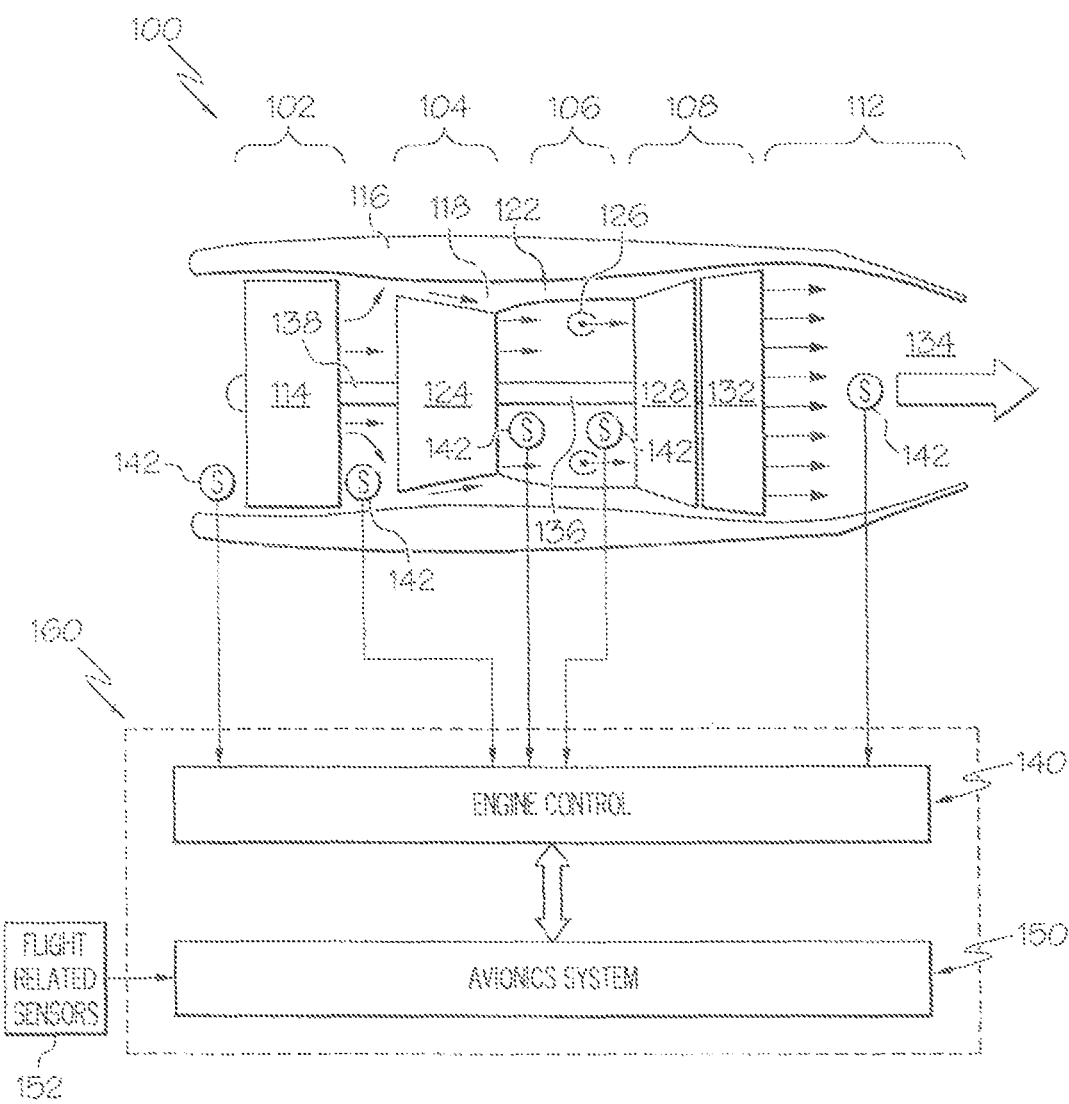
FIG. 1 depicts a functional block diagram of an exemplary gas turbine engine.

Referring first to FIG. 1, a functional block diagram of an exemplary gas turbine engine is depicted. The depicted engine 100 is a multi-spool turbofan gas turbine aircraft propulsion engine, and includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through a propulsion nozzle 134 disposed in the exhaust section 112, providing additional forward thrust. As the turbines 128 and 132 rotate, each drives equipment in the engine 100 via concentrically disposed shafts or spools. Specifically, the high pressure turbine 128 drives the compressor 124 via a high pressure spool 136, and the low pressure turbine 132 drives the fan 114 via a low pressure spool 138.

The operation of the engine 100 is controlled via a control system 160. In the depicted embodiment, the control system 160 includes an engine control 140 and an aircraft avionics system 150. Each of which will be separately described, beginning first with the engine control 140. Before doing so, however, it will be noted that one or more (or even all) of the functions described herein as being implemented in the engine control 140 could instead be implemented in the avionics system 150, and vice-versa. Moreover, one or more (or even all) of the functions implemented in the engine control 140 and/or avionics system 150 could be implemented in one or more other systems or sub-systems, as needed or desired.

The engine control 140 may be variously implemented. For example, it may be implemented as any one of numerous electronic engine controllers (EECs), as any one of numerous engine control units (ECUs), as a Full-Authority Digital Engine Controller (FADEC), or as any one of numerous electro-mechanical engine controls, just to name a few non-limiting examples. Regardless of the implementation, the engine control 140 is configured, among other things, to control the propulsion thrust generated by the engine 100 by, for example, controlling fuel flow rate to the engine 100. In the depicted embodiment, the engine control 140 receives, for example, a throttle position signal from one of a plurality of sources, which are discussed in more detail further below. The engine control 140 also receives sensor signals from a plurality of sensors 142 that are disposed at various locations on and within the engine 100. The sensors 142 are used to sense various operational parameters associated with the engine such as, for example, various temperatures, speeds, and air flow, and supply signals representative of the sensed parameters to the engine control 140. The engine control 140 processes the signals received from the throttle position signal and the sensor signals and, among other things, supplies various commands to the engine 100 to control the generated propulsion thrust.

Figure 2:
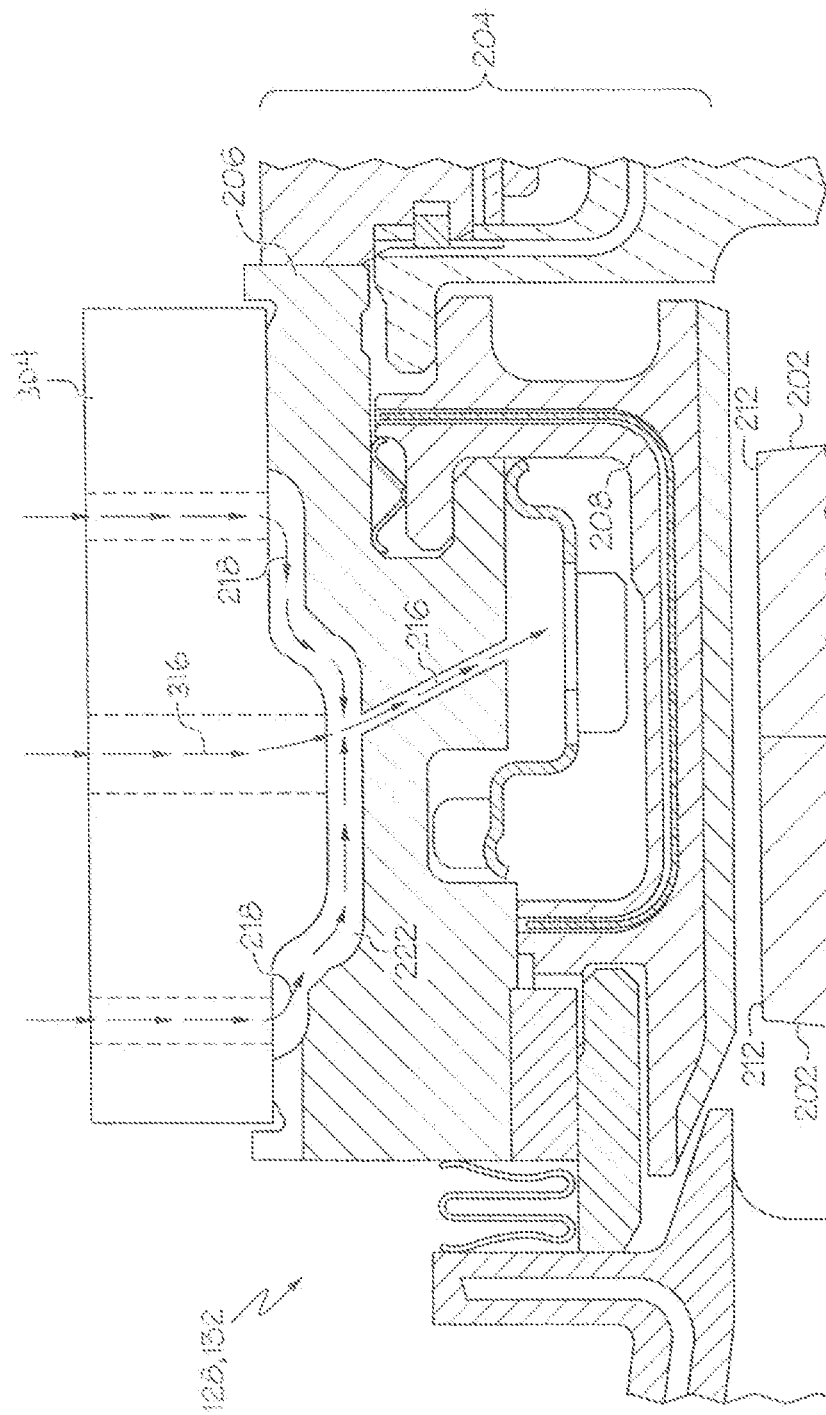
FIG. 2 depicts a cross section view of a portion of one of the turbines within the gas turbine engine of FIG. 1.

In addition to controlling the propulsion thrust that is generated by the engine 100, the engine control 140 is configured to control the turbine blade tip-to-static structure clearance in the engine 100. This is because the operational clearances between static engine structures and the tips of rotating turbine blades impact the thermodynamic efficiency and specific fuel consumption (SFC) of the engine 100. In particular, and reference now to FIG. 2, a cross section view of a portion of one of the turbines 128 or 132 is depicted. The depicted turbine, whether it is the high pressure turbine 128 or the low pressure turbine 132, includes a plurality of rotationally mounted rotor turbine blades 202 and various static structures 204, such as a turbine case 206 and a shroud 208. As is generally known, each of the plurality of turbine blades 202 extends radially outward to a turbine blade tip 212 that is spaced apart from the static structure 204, in this case the shroud 208, by a clearance that is referred to herein as "the turbine blade tip-to-static structure clearance."

The turbine blade tip-to-static structure clearance may be selectively controlled by controlling a flow of cooling air to portions of the static structures 204. The source of the cooling air may also vary, but is typically compressed air discharged from the engine compressor section 104. The manner in which the compressor discharge air is controlled may also vary, but in the depicted embodiment it is controlled via a control mechanism 214. In particular, the control mechanism 214 is coupled to receive actuation commands supplied from the engine control 140 and is configured, in response thereto, to selectively move between two positions—a first position and a second position. It will be appreciated that the control mechanism 214 may be variously configured and implemented. Two particular, non-limiting embodiments are depicted in FIGS. 3 and 4, and with reference thereto will now be described beginning first with the embodiment depicted in FIG. 3.

Figure 3:
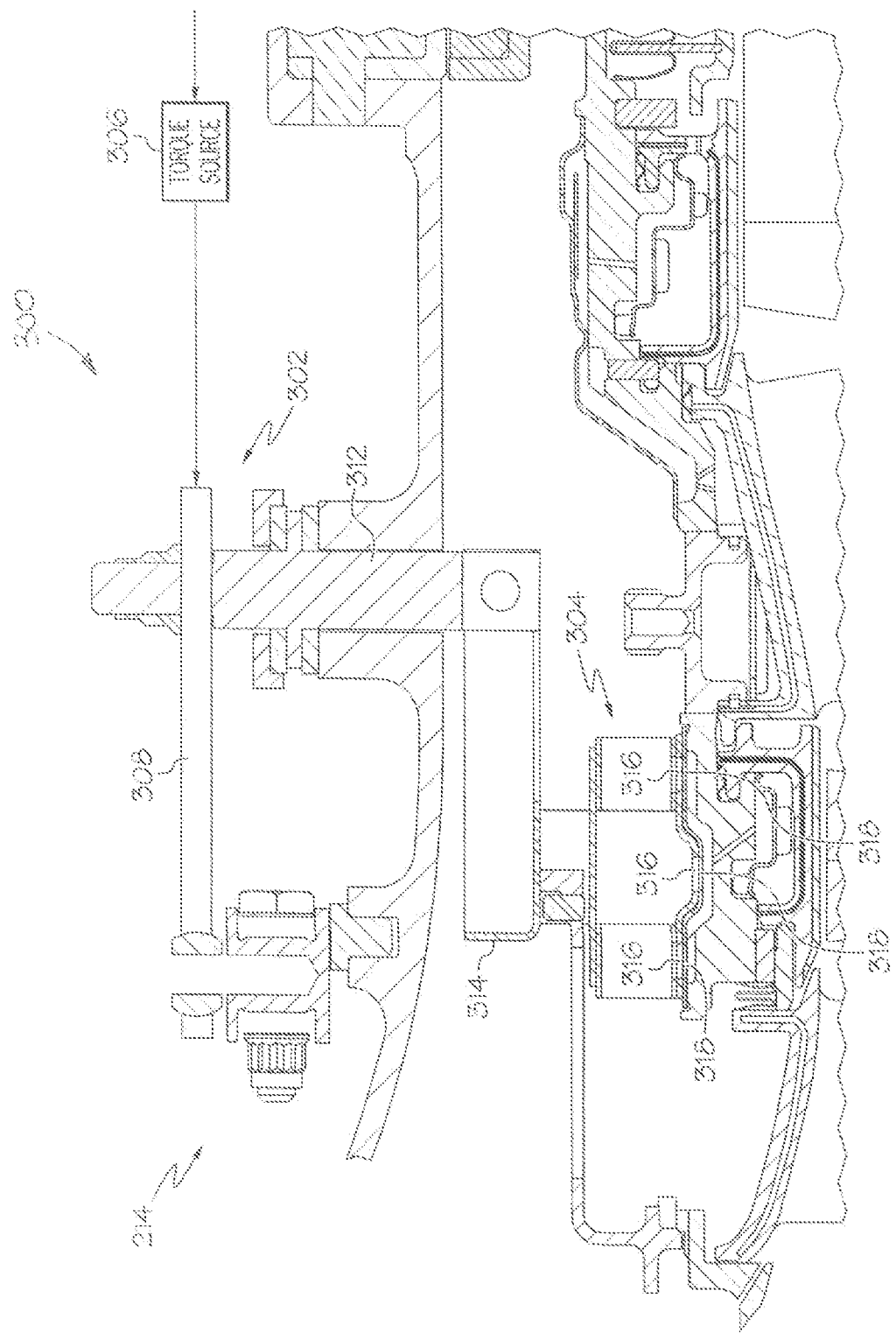
FIGS. 3 and 4 depict different embodiments of a control mechanism that may be implemented in the gas turbine engine of FIG. 1.
Figure 4:
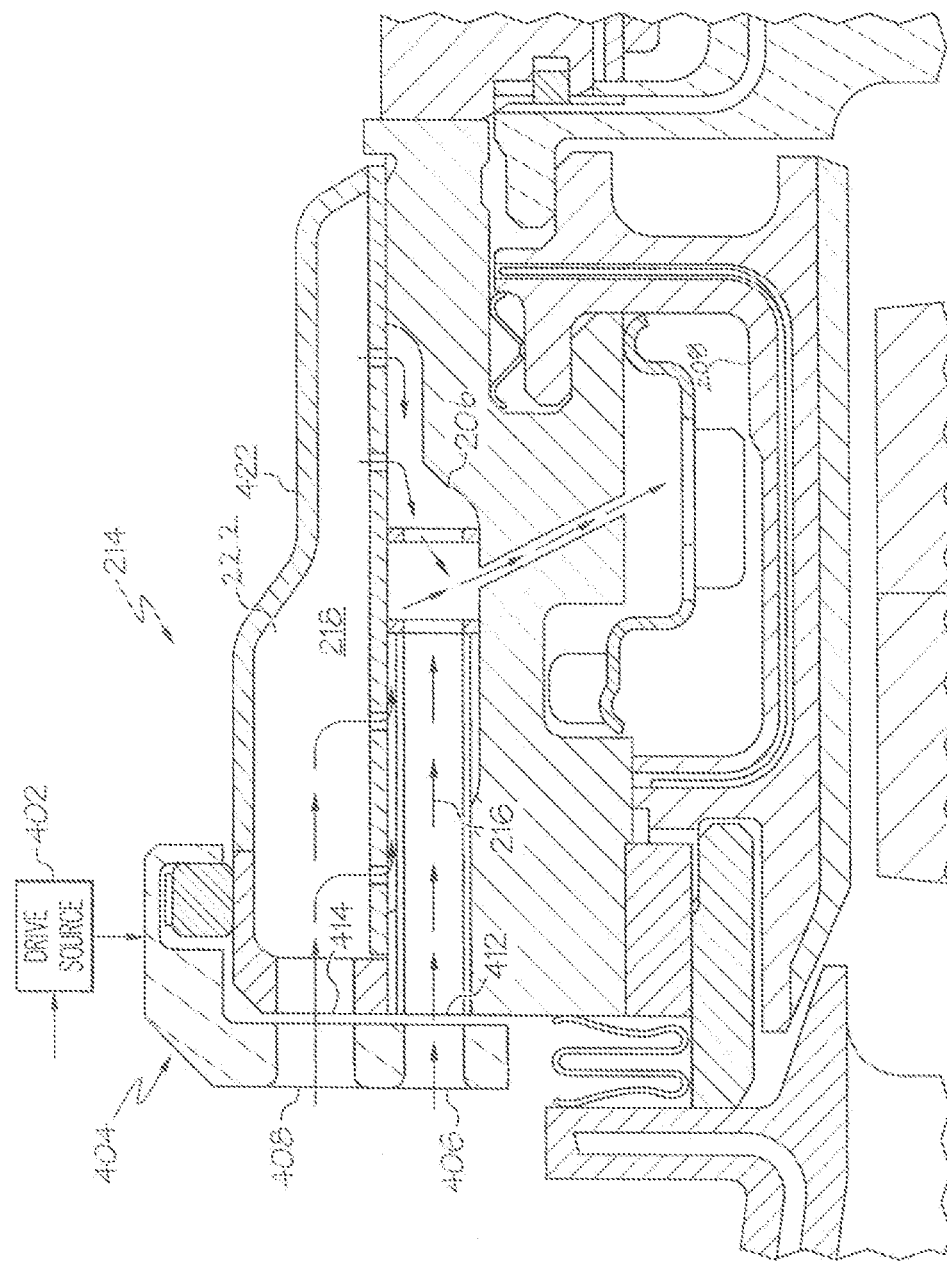

The control mechanism 214 depicted in FIG. 3 is a sleeve valve 300 that includes an actuation mechanism 302 and a valve element 304. The actuation mechanism 302 may also be variously configured and implemented, but in the depicted embodiment it includes a torque source 306, a torque arm 308, a torque shaft 312, and a flex beam 314. The torque source 306, which may be, for example, an electric motor, is coupled to receive the actuation commands from the engine control 140 and is configured, in response thereto, to supply a drive torque to the torque arm 308. The torque arm 308 is coupled to the torque shaft 312, which is in turn coupled to the flex beam 314. The torque arm 308, upon receipt of the drive torque from the torque source 306, supplies a torque to the torque shaft 312, causing it to rotate, which in turn causes the flex beam 314 to rotate. As the flex beam 314 rotates, so does the valve element 304.

The valve element 304 has a plurality of openings 316 formed therein, and the engine case 206 includes a plurality of flow paths 318. The position of the valve element 304 controls the alignment of the openings 316 and flow paths 318. As such, the position of the valve element 304 controls whether compressor discharge air is directed to impinge upon the turbine shroud 208 (or at least a portion thereof), or whether compressor discharge air is directed to flow across the turbine case 206 (or at least a portion thereof) and to impinge upon the turbine shroud 208 (or at least a portion thereof).

With reference back to FIG. 2, when the valve element 304 is in the first position, the openings 316 and flow paths 318 are aligned such that compressor discharge air is directed through a plurality of first flow passages 216 (only one shown) to impinge upon only the turbine shroud 208 (or at least a portion thereof). When the valve element 304 is in the second position, the openings 316 and flow paths 318 are aligned such that compressor discharge air is directed to both flow across the turbine case 206 (or at least a portion thereof) and to impinge upon the turbine shroud 208 (or at least a portion thereof). To facilitate this flow of compressor discharge air, the outer diameter of the turbine case 206 has baffles that define chambers 222. These chambers 222 define second flow passages 218 that provide convection cooling that is optimized to the thermal-deflection requirements of the turbine 128 or 132. The compressor discharge air that is supplied to these chambers 222 is subsequently discharged, via only a portion of the first flow passage 216, to impinge upon the turbine shroud 208.

Turning now to FIG. 4, the control mechanism 214 depicted therein includes an actuation drive source 402 and a port plate 404. The actuation drive source 402, which may be, for example, an electric motor, is coupled to receive the actuation commands from the engine control 140 and is configured, in response thereto, to supply an actuation force to the port plate 404 to thereby move it between a first position and a second position.

The port plate 404 has a plurality of first plate openings 406 and a plurality of second plate openings 408 formed therein. Similarly, the engine case 206 has a plurality of first case openings 412 and a plurality of second case openings 414. The position of the port plate 404 controls the alignment of the first and second plate openings 406, 408 with the first and second case openings 412, 414, respectively. As such, the position of the port plate 404 controls whether compressor discharge air is directed to impinge upon the turbine shroud 208 (or at least a portion thereof), or whether compressor discharge air is directed to flow across the turbine case 206 (or at least a portion thereof) and to impinge upon the turbine shroud 208 (or at least a portion thereof).

More specifically, when the port plate 404 is in the first position, the first plate openings 406 and first case openings 412 are aligned, but the second plate openings 408 and second case openings 414 are not. Thus, compressor discharge air is directed through the first case openings 412, through the plurality of first flow passages 216 (only one shown) to impinge upon only the turbine shroud 208 (or at least a portion thereof). Conversely, when the port plate 404 is in the second position, the second plate openings 408 and second case openings 414 are aligned, but the first plate openings 406 and first case openings 412 are not. Thus, compressor discharge air is directed to both flow across the turbine case 206 (or at least a portion thereof) and to impinge upon the turbine shroud 208 (or at least a portion thereof). To facilitate this flow of compressor discharge air, a manifold 422 is coupled to the engine case 206. The manifold defines the previously described chamber 222 that in turn define the previously described second flow passages 218. The compressor discharge air that is supplied to these chambers 222 is subsequently discharged, via only a portion of the first flow passages 216, to impinge upon the turbine shroud 208.

Before proceeding further, it is noted that in some embodiments the control mechanism 214 depicted in FIG. 4 could be configured such that the port plate 404 will lift off and re-land in the first or second positions or, when it is moved to the second position, to just lift off and align all of the plate and case openings.

It would be preferable to be able to controllably maintain the turbine blade tip-to-static structure clearance at a minimum clearance value throughout engine operations, including transient operations. Unfortunately, the lengths of the blade tips 212 typically vary at a different rate than the static structures 204 can expand or contract. Thus, the engine control 140, either alone or together with portions of the aircraft avionics system 150, which will be described in more detail momentarily, implements a method to control the turbine blade tip-to-static structure clearance in such a manner that turbine blade tip-to-static structure clearance is minimized at altitude cruise conditions. This method will also be described in more detail momentarily. Before doing so, however, portions of the aircraft avionics system 150 will now be described in more detail.

The avionics system 150 is coupled to receive aircraft data from various flight-related sensors 152 and is configured, in response to the aircraft data, to determine when the aircraft is flying at altitude cruise conditions. As used herein, the term "altitude cruise conditions" means the aircraft is flying at a substantially constant altitude and the engine(s) 100 is (are) operating at substantially constant engine power. It will be appreciated that the number and type of flight-related sensors 152 may vary and may include, for example, inertial sensors, altitude sensors, attitude sensors, and speed sensors, just to name a few. The avionics system 150, upon determining that the aircraft is flying at altitude cruise conditions, supplies a signal representative thereof to the engine control 140. The engine control 140, in response to this signal, controls the flow of cooling air to the static structures 204 to reduce the turbine blade tip-to-static structure clearance.

As was previously noted, the control system 160, via the engine control 140 or the engine control 140 and the avionics system 150 in combination, implements a method to control the turbine blade tip-to-static structure clearance in such a manner that the clearance is minimized during cruise conditions. The general method 500 is depicted in flowchart form in FIG. 5, and with reference thereto will be described in more detail. Before doing so, however, it is noted that the following discussion is based on certain functions being implemented in the engine control 140 and others being implemented in the avionics system 150. It will be appreciated that this is merely exemplary, and that one or all of the functions described as being implemented in the engine control 140 could be implemented in the avionics system 150, and vice-versa.

Figure 5:
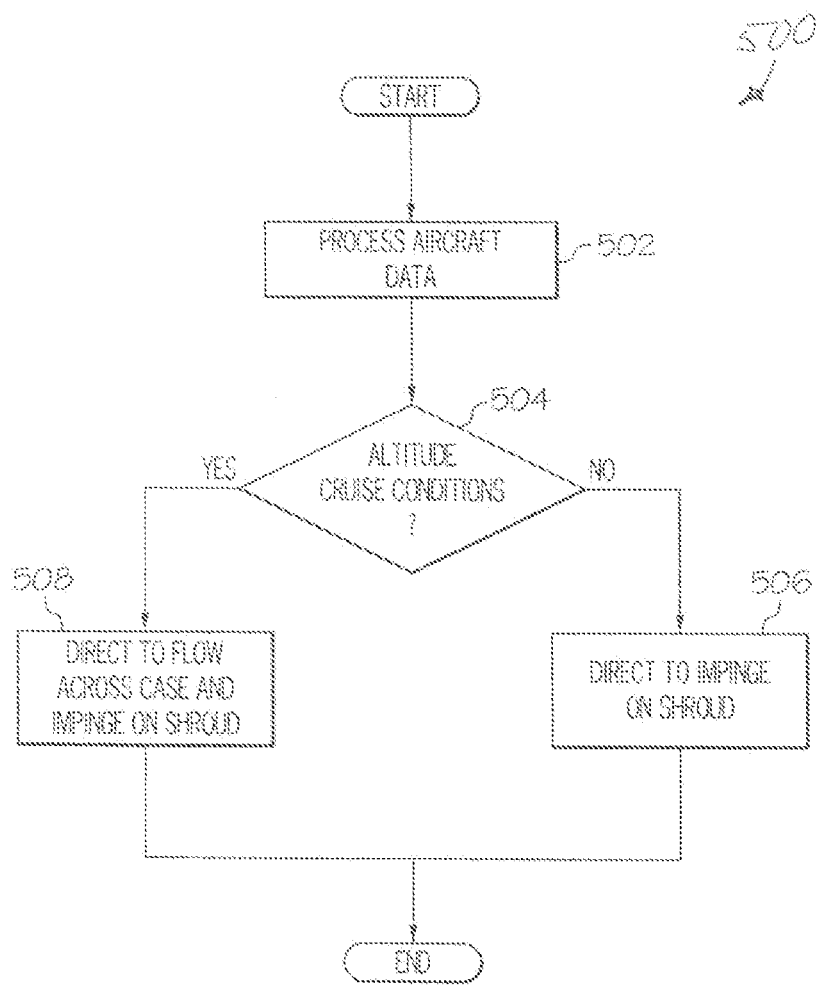
FIG. 5 depicts one embodiment of a method, in flowchart form, of controlling the turbine blade tip-to-static structure clearance in the engine of FIG. 1.

Turning now to FIG. 5, the general method 500 begins by processing aircraft data to determine when the aircraft is flying at altitude cruise conditions (502). As alluded to above, this determination can be made by the avionics system 150, the engine control 140, or both. Regardless of where the determination is made, if it is determined that the aircraft is not flying at altitude cruise conditions, then compressor discharge air is directed to impinge upon at least a portion of the turbine shroud 208 (504). More specifically, the engine control 140 supplies actuation commands to the control mechanism 214 that causes the control mechanism 214 to be in (or move to) the first position. If, however, it is determined that the aircraft is flying at altitude cruise conditions, the compressor discharge air is directed to flow across at least a portion of the turbine case 208 and to impinge upon at least a portion of the turbine shroud 208 (506). More specifically, the engine control 140 supplies actuation commands to the control mechanism 214 that causes the control mechanism 214 to be in (or move to) the second position. Preferably, the control system 160 is configured such that the compressor discharge air is directed to flow across at least a portion of the turbine case 206 and to impinge upon at least a portion of the turbine shroud 208 a predetermined time after it is determined that the aircraft is flying at altitude cruise conditions.

This system and method described herein combines the benefits of both tighter initial (e.g., cold-build) tip clearances with optimized cooling/closure at altitude cruise conditions to provide significant improvement in turbine blade tip-to-static structure clearance.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling turbine blade tip-to-static structure clearance in a gas turbine engine that is installed on an aircraft and that includes a turbine shroud and a turbine case, the method comprising the steps of:
    processing aircraft data supplied from flight-related sensors to determine when the aircraft is flying at altitude cruise conditions;
    directing compressor discharge air to only impinge upon at least a portion of the turbine shroud when it is determined that the aircraft is not flying at altitude cruise conditions; and
    upon determining that the aircraft is flying at altitude cruise conditions, directing the compressor discharge air to flow across at least a portion of the turbine case and to impinge upon at least a portion of the turbine shroud, wherein aircraft cruise conditions means the aircraft is flying at a substantially constant altitude and the engine is operating at substantially constant engine power.

2. The method of claim 1, further comprising:
directing the compressor discharge air to flow through a first flow passage when the aircraft is not flying at altitude cruise conditions;
directing the compressor discharge air to flow through a second flow passage and through only a portion of the first flow passage when the aircraft is flying at altitude cruise conditions.

3. The method of claim 1, further comprising:
directing the compressor discharge air to flow across at least a portion of the turbine case and to impinge upon at least a portion of the turbine shroud a predetermined time after determining that the aircraft is flying at altitude cruise conditions.

4. The method of claim 1, further comprising:
selectively moving a control mechanism between a first position and a second position based upon whether the aircraft is flying at altitude cruise conditions.

5. The method of claim 4, further comprising:
selectively supplying actuation commands from an engine control to the control mechanism to thereby selectively move the control mechanism.

6. A turbine blade tip-to-static structure clearance control system, comprising:
an aircraft gas turbine engine comprising a compressor section and a turbine section, the turbine section mounted in an engine case and including a plurality of turbine blades surrounded by a shroud, each turbine blade having a turbine blade tip that is spaced apart from the shroud by a clearance; and
a control system in operable communication with the aircraft gas turbine engine and coupled to receive aircraft data from flight-related sensors, the control configured to:
process the aircraft data to determine when the aircraft is flying at altitude cruise conditions;
direct air discharged from the compressor section to only impinge upon at least a portion of the turbine shroud when it is determined that the aircraft is not flying at altitude cruise conditions; and
upon determining that the aircraft is flying at altitude cruise conditions, direct the air discharged from the compressor section to flow across at least a portion of the turbine case and to impinge upon at least a portion of the turbine shroud,
wherein aircraft cruise conditions means the aircraft is flying at a substantially constant altitude and the engine is operating at substantially constant engine power.

7. The system of claim 6, wherein:
the control system is further configured to supply actuation commands; and
the system further comprises a control mechanism mounted in the aircraft gas turbine engine and coupled to receive actuation commands, the control mechanism configured, in response to the actuation commands, to move between a first position and a second position.

8. The system of claim 7, wherein the control mechanism is configured such that:
in the first position, the air discharged from the compressor section is directed to flow through a first flow passage when the aircraft is not flying at altitude cruise conditions; and
in the second position, the air discharged from the compressor section is directed to flow through a second flow passage and through only a portion of the first flow passage when the aircraft is flying at altitude cruise conditions.

9. The system of claim 7, wherein the control system is configured to supply actuation commands to the control mechanism that cause the control mechanism to move to the second position a predetermined time after determining that the aircraft is flying at altitude cruise conditions.

10. A turbine blade tip-to-static structure clearance control system, comprising:
an aircraft gas turbine engine comprising a compressor section and a turbine section, the turbine section mounted in an engine case and including a plurality of turbine blades surrounded by a shroud, each turbine blade having a turbine blade tip that is spaced apart from the shroud by a clearance;
a control system in operable communication with the aircraft gas turbine engine and coupled to receive aircraft data from flight-related sensors, the control configured to process the aircraft data to determine when the aircraft is flying at altitude cruise conditions and, based on this determination, to supply actuation commands; and
a control mechanism mounted in the aircraft gas turbine engine and coupled to receive the actuation commands, the control mechanism configured, in response to the actuation commands, to move between a first position and a second position,
wherein:
in the first position, the air discharged from the compressor section is directed from the compressor section to only impinge upon at least a portion of the turbine shroud when the aircraft is not flying at altitude cruise conditions;
in the second position, the air discharged from the compressor section is directed to flow across at least a portion of the turbine case and to impinge upon at least a portion of the turbine shroud; and
wherein aircraft cruise conditions means the aircraft is flying at a substantially constant altitude and the engine is operating at substantially constant engine power.

11. The system of claim 10, wherein:
the actuation control commands supplied to the control mechanism when the aircraft is not flying at altitude cruise conditions command the control mechanism to the first position; and
the actuation control commands supplied to the control mechanism when the aircraft is flying at altitude cruise conditions command the control mechanism to the second position.

12. The system of claim 11, wherein:
in the first position, the air discharged from the compressor section is directed to flow through a first flow passage; and
in the second position, the air discharged from the compressor section is directed to flow through a second flow passage and through only a portion of the first flow passage when the aircraft is flying at altitude cruise conditions.

13. The system of claim 11, wherein the control system is configured to supply actuation commands to the control mechanism that cause the control mechanism to move to the second position a predetermined time after determining that the aircraft is flying at altitude cruise conditions.

* * * * *